United States Patent [19]

Schwartz et al.

[11] Patent Number: 5,442,276
[45] Date of Patent: * Aug. 15, 1995

[54] APPARATUS FOR PROVIDING CONTROLLED MECHANICAL BRAKING TORQUE

[75] Inventors: Rodney E. Schwartz, Tempe; Steven T. Clauter, Scottsdale; Gary M. Orman, Paradise Valley, all of Ariz.

[73] Assignee: Integrated Technology Corporation, Tempe, Ariz.

[*] Notice: The portion of the term of this patent subsequent to Feb. 23, 2010 has been disclaimed.

[21] Appl. No.: 21,275

[22] Filed: Feb. 22, 1993

Related U.S. Application Data

[63] Continuation-in-part of Ser. No. 335,791, Mar. 27, 1989, Pat. No. 5,189,360.

[51] Int. Cl.⁶ .............................................. H02P 9/00
[52] U.S. Cl. ............................................ 322/25; 322/100
[58] Field of Search ...................... 322/10, 29, 25, 32, 322/35, 40, 100

[56] References Cited

U.S. PATENT DOCUMENTS

| | | | |
|---|---|---|---|
| 2,721,305 | 10/1955 | Steinitz | 322/24 |
| 2,767,367 | 10/1956 | Black | 322/32 |
| 3,098,190 | 7/1963 | Spencer et al. | 322/29 |
| 3,230,381 | 1/1966 | Grinnell et al. | 290/4 |
| 3,947,744 | 3/1976 | Grace et al. | 320/61 |
| 3,974,396 | 8/1976 | Schonball | 290/54 |
| 4,326,158 | 4/1982 | Helgesen | 322/4 |
| 4,423,363 | 12/1983 | Clark et al. | 318/375 |
| 4,636,707 | 1/1987 | Law | 322/35 |
| 4,720,666 | 1/1988 | Yokota | 322/10 |
| 4,899,074 | 2/1990 | West | 310/154 |
| 4,964,028 | 10/1990 | Spataro | 363/56 |

Primary Examiner—Kristine L. Peckman
Attorney, Agent, or Firm—Renner, Otto, Boisselle & Sklar

[57] ABSTRACT

Apparatus and method for electrically generating mechanical braking torque employs direct field drive incorporating an AC alternator plus a current regulator. The stator windings of the alternator are directly coupled to the field winding via a full wave rectifier and the current regulator. The invention simplifies electrical circuitry for generating braking torque, provides wide dynamic range of torque generation, limits voltages and currents to easily manageable levels, and reduces mechanical drive train requirements. The invention produces a constant power mechanical load from essentially 0 to over 1,000 watts from an alternator of the size typically used for automotive applications.

21 Claims, 7 Drawing Sheets

APPARATUS FOR PROVIDING CONTROLLED MECHANICAL BRAKING TORQUE

CROSS REFERENCE TO RELATED APPLICATION

This application is a continuation-in-part of, commonly assigned U.S. Patent Application Ser. No. 07/335,791, filed Mar. 27, 1989, now U.S. Pat. No. 5,189,360 the entire disclosure of which is incorporated herein by reference.

TECHNICAL FIELD

The invention relates generally, as is indicated, to an apparatus for providing controlled braking torque and, more particularly, to providing such braking torque for mechanical systems.

BACKGROUND

The prior art electrical means of generating mechanical braking torque have generally involved application of alternators, generators, motors, eddy current drives, and magnetic brakes. These traditional designs are all limited due to the relatively high cost of the required components, circuit complexity, large physical size, power dissipation, and restricted speed and torque ranges. Often high electrical currents and large voltage pulses have resulted in poor reliability and also emitted large quantities of electromagnetic interference (EMI). Audible noise as well as mechanical vibration and the associated power losses have further reduced the effectiveness of these conventional torque generating devices due to rotational components in the drive lines and the requirement for large gear ratios. With this background, it is apparent that a new method of braking torque generation is required.

In one conventional electronic device for providing mechanical braking torque, an alternator is used with two electronic regulators typically being required, one to maintain a constant output voltage from the alternator and a second to regulate the load current flowing through a load resistor. Voltage and current are separately regulated. The total power dissipation is the product of the output voltage times the load current. There are a number of disadvantages to such prior art devices, including, for example, instability and reliability, circuit complexity, high alternator output currents under heavy loads, high power dissipation in general and usually confinement of power dissipation to parts that have small surface areas and, therefore, excessive heat, poor low rpm performance, small dynamic load range, and large initial mechanical load.

BRIEF SUMMARY OF THE INVENTION

Briefly, in the electrical apparatus for generating a mechanical braking torque according to one aspect of the present invention, included is an AC alternator with a rectified DC output coupled to a current regulator which controls the amount of current which flows from the alternator stator output and back into the field of the alternator. Current induced in the stator flows back into the field winding after being regulated, and since the current is regulated and the electrical resistance of the stator and field are fixed, the total power dissipation is the square of the current times the total resistance of both the stator and field. Thus, induced current is used for both exciting the field winding and generating the braking torque.

According to another aspect of the invention, an electrical apparatus for generating braking torque is provided which includes an electro-mechanical device which generates electrical energy as a function of a mechanical input using at least one winding, the at least one winding being lossy; and means for dissipating substantially all the electrical energy in the at least one winding to generate the mechanical braking torque.

According to still another aspect of the invention, an electrical apparatus for generating a braking torque is provided including an electro-mechanical device having a winding for generating an electrical current as a function of a mechanical input, the winding being lossy; and means for directing substantially all of the electrical current into the winding to result in said mechanical braking torque.

A preferred embodiment of the invention includes an electro-mechanical device which has lossier or more resistive windings, e.g., windings made of smaller gauge wire and/or more turns, than had previously been required for electrical devices, to produce braking torque. Preferably, the windings are sufficiently lossy to dissipate via $I^2R$ losses more than 30% of the convened electrical energy produced as a result of a mechanical input, and more preferably dissipate somewhere in the range of 80% to 100% of the convened electrical energy. The windings in a conventional electromechanical device are relatively non-lossy and will dissipate less than 30% of the electrical energy associated with an electro-mechanical conversion. Fitzgerald, A. E., et at., *Electric Machinery*, McGraw Hill Book Company (1971), p. 214. Heat is generated in the winding(s) where it is more easily removed, and more torque can be generated by the electro-mechanical device at lower field rpm than had been possible in the past due to the higher torque constant (K-T) achieved. The term "K-T" represents torque constant; it is the measure of how much mechanical torque is required to turn the brake for a given amount of electrical current. Units typically are Foot-pounds per ampere.

The foregoing and other objects, aspects, features and advantages of the invention will become more apparent from the following description and associated drawings. It will be appreciated that the present invention is described in detail herein with respect to a few preferred embodiments; however, the scope of the invention is defined in the claims and equivalents thereof.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

DESCRIPTION OF EXEMPLARY PRIOR ART APPARATUS

Figure 1:
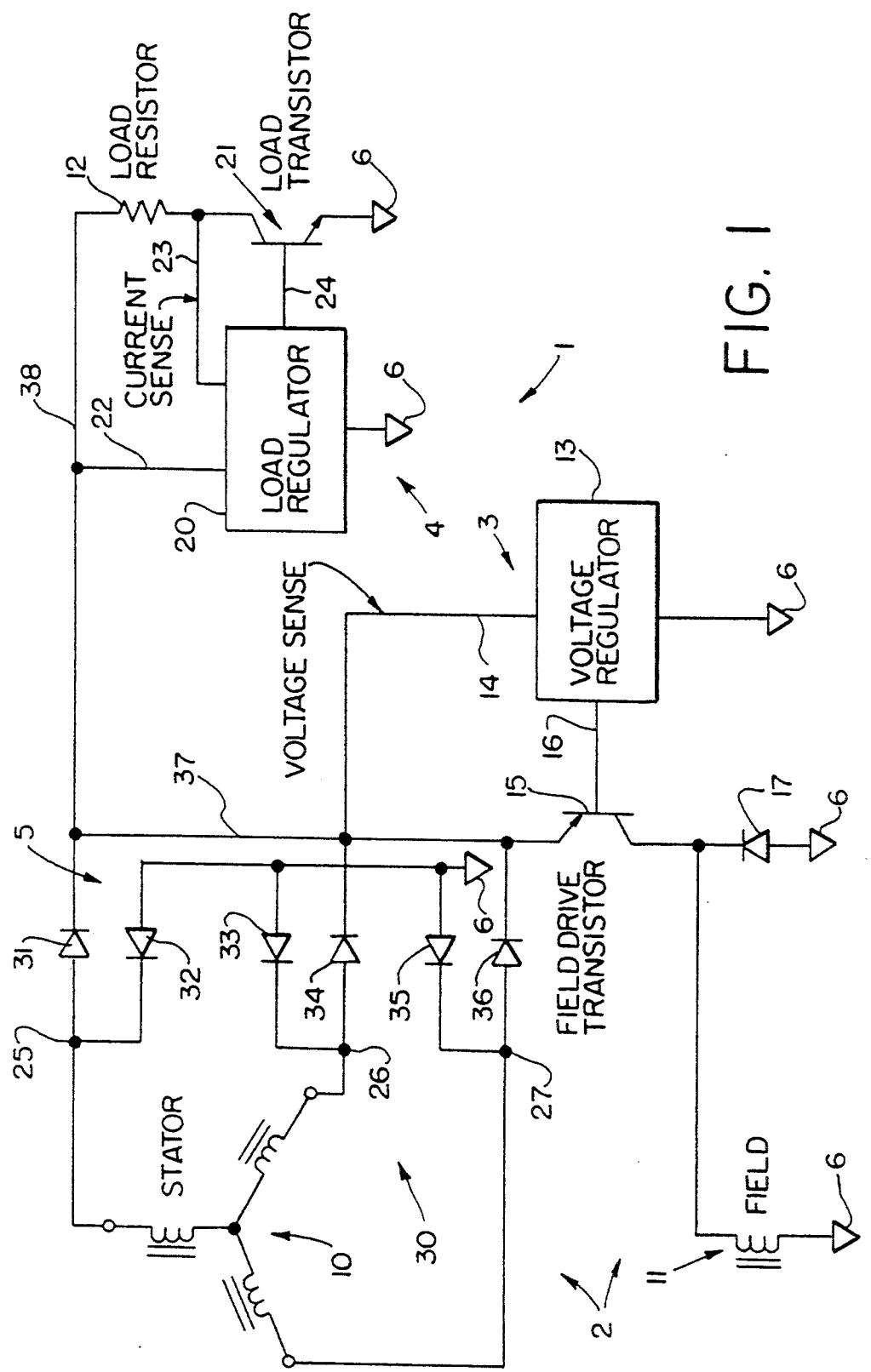
FIG. 1 is a schematic illustration of a prior art apparatus using an alternator to maintain a constant power load for generating a mechanical braking torque.

Referring to FIG. 1, a prior art electrical circuit apparatus 1 for generating mechanical braking torque is illustrated. The apparatus 1 includes an alternator 2, two regulator devices or circuits 3, 4, a bridge rectifier assembly 5 and the various ground or common connections 6. The alternator 2 includes a three phase stator 10 and a field 11, as is well known.

One of the regulator circuits 3, for example, is a voltage regulator intended to regulate the output voltage from the alternator 2. The other regulator circuit 4 is a current regulator intended to regulate the load current flowing through a load resistor 12 thereof. The voltage regulator circuit 3 includes a conventional electronic voltage regulator 13 having a voltage sensing input connection or lead 14 coupled to the output side of the rectifier 5 to sense the output voltage from the alternator stator. The voltage regulator circuit 3 also includes a field drive transistor 15, the base of which is controlled by the output 16 from the electronic voltage regulator 13. The field drive transistor 15 is coupled (as is illustrated, the emitter of the transistor) to the output side of the rectifier 5 to receive the output voltage of the stator 10 and to the field 11 (at the collector of the transistor). The electronic voltage regulator 13 may be a standard pulse width modulation type of device well known in the industry which provides a constant frequency, variable pulse width drive via the output 16 thereof to the field drive or "pass" transistor 15. A flyback diode 17 also is coupled between ground and the junction of the field 11 and the field drive transistor 15.

The current regulator circuit 4 includes the load resistor 12, an electronic load regulator 20, and a load transistor 21. The load regulator 20 includes a voltage input connection or lead 22 to the output side of the bridge rectifier assembly 5, a current sensing input connection or lead 23 coupled to the junction of the load resistor 12 and the load transistor 21, and an output 24 coupled to the base of the load transistor 21 to control the latter. The electronic load regulator is a standard linear type device, and is operative to bias the base input of the load (or pass) transistor 21. The bias, or drive level, on line 24 is a function of the voltage at the junction of the load resistor 12 and load transistor 21; such voltage is a function of current through the load resistor 12 and is coupled to the load regulator via line 23.

In the apparatus 1, the regulators 13, 20 are of the type and are coupled according to those used in a conventional automotive type of regulator system that maintains 12 volt DC output from the alternator 2. Total power dissipation is the product of the output voltage at the output of the bridge rectifier assembly 5 and the load current through the load resistor 12.

During operation of the apparatus 1 of FIG. 1, the stator 10, which is illustrated as a three-phase stator, provides three-phase AC voltage to nodes 25, 26, 27 at the input 30 of the bridge rectifier assembly 5. Such three-phase voltage is rectified by the rectifier (more specifically by the diodes 31-36 thereof) and is provided as a positive voltage at the output 37 of the bridge rectifier assembly 5 with respect to the ground (or other common potential) connection 6. The electronic voltage regulator 13 senses the voltage at the output 37 of the bridge rectifier assembly 5 with respect to ground 6 and increases or decreases the pulse width of the signal on output 16 delivered to the base of the field drive transistor 15 to maintain a constant voltage from output 37 relative to ground 6 by the corresponding increase (or decrease) in drive to the alternator field winding 11.

The flyback diode 17 is connected between the junction of field drive transistor 15 and field 11 and the ground 6. The flyback diode 17 prevents damaging reverse voltages from occurring across the field drive transistor 15 and the switching voltage regulator 13 during the OFF time of the pulse width modulated cycle.

A constant current load is provided to the output 37 of the bridge rectifier assembly 5 by the load regulator circuit 4. The load resistor 12 is used to sense the load current in line 38. The electronic load regulator 20 adjusts the bias current to the base input of the load transistor 21 to maintain the load current constant, as is well known.

With both current through the load resistor 12 and voltage at the output 37 of the bridge rectifier assembly 5 maintained at a constant level, then, the power output of the alternator 2 is constant and a constant load torque is presented at the rotating shaft (not shown) of the alternator 2. The setpoint of the load regulator 20 may be changed to vary the torque, as may be desired.

A number of disadvantages inure to the prior art apparatus 1 described above. The circuitry is relatively complex due to the need for two separate electronic regulators, and, therefore, the control circuitry may lack stability and reliability under all load conditions. Under heavy loads alternator output currents are high, for example, under a 300 watt load the alternator must output 25 amps, that is, 12 volts times 25 amps equals 300 watts.

Power dissipation in the load regulator 20 is high, for example, at one half the maximum power point the load current regulator is dissipating as much power as the load resistor. In this regard, note that the size of the load resistor is equal to 12 volts divided by the maximum design current of 25 amperes (Load Resistor=12 V/25 A), namely, 0.48 ohms. Therefore at 12.5 amperes (one half the maximum design current) the load resistor power equals the current squared times the resistance of the load resistor (Load resistor power=$I^2 *R$), namely [$(12.5)^2$]*0.48=75 watts.

Figure 3:
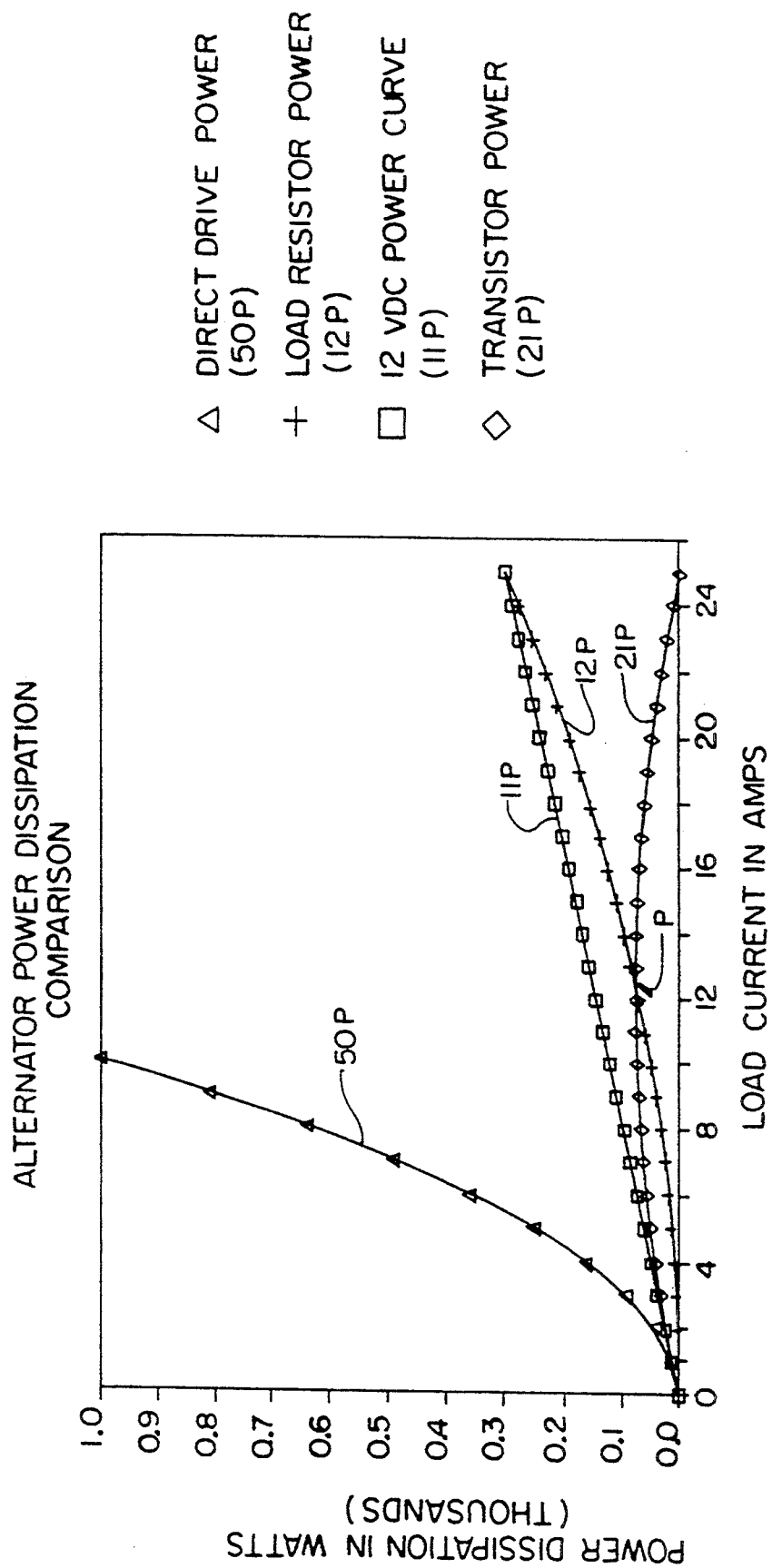
FIG. 3 is a graph depicting power dissipation with respect to current in a number of components.

In the graph of FIG. 3 are illustrated curve 21P representing power dissipation in the load transistor 21, curve 12P representing power dissipation in the load resistor 12P, and curve 11P representing power dissipation in the field 11. From the graph of FIG. 3, the half-power point P is seen to be the same as the maximum power point for the load transistor 21. Note, too, the current flowing through the load resistor 12 and the load transistor 21 is completely separate from the current flowing through the field winding 11.

Moreover, since power dissipation is confined to parts with small surface areas such parts heat up to very high undesirable temperatures. For example, the load resistor 12, load transistor 21, and the bias circuitry in the load regulator 20 will heat up and require considerable heat-sinking. The load transistor 21 in particular is a very confined surface area device, well under one square inch. By contrast, the direct drive alternator technique of the present invention will dissipate this same power through the field and stator windings with a surface area on the order of 100 square inches, as will be described in further detail below; in fact, according to the invention, the alternator of the invention may employ forced ventilation, which will further increase heat dissipation. Since the field drive is limited, for example, to a 12 volts DC source, alternator performance is poor at relatively low rpm's. Additionally, the dynamic load range is relatively small; the maximum load is fixed by the square of the voltage divided by the load resistance. Finally, there is a relatively large initial mechanical load due to the small torque constant of the alternator requiring the alternator rpm to be kept relatively high.

DESCRIPTION OF THE PREFERRED EMBODIMENTS

Figure 2:
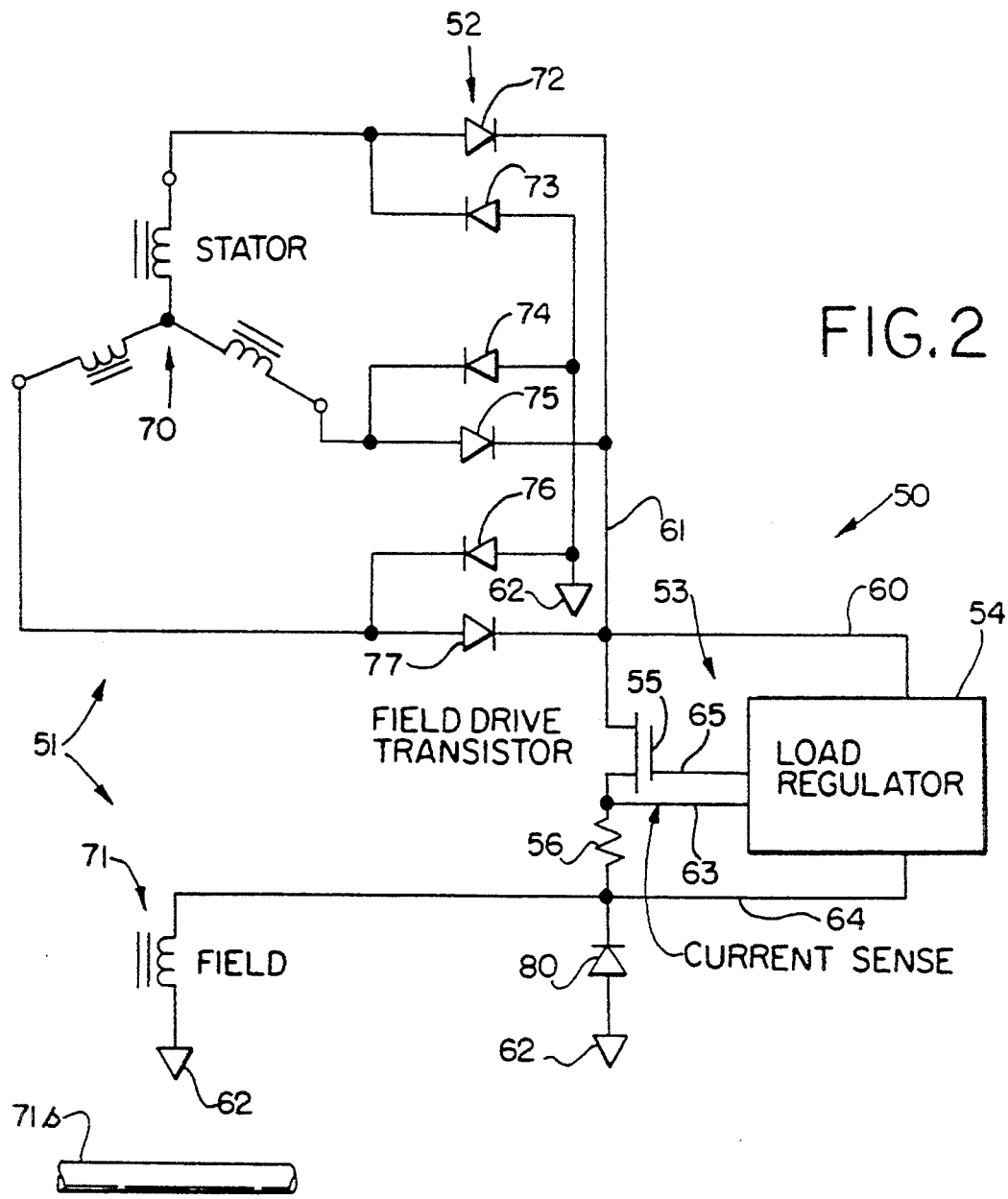
FIG. 2 is a schematic illustration of an apparatus according to the invention using a direct field drive to generate braking torque and to obtain a constant power load.

An electrical apparatus 50 for generating a mechanical braking torque according to the present invention is illustrated in FIG. 2. The apparatus 50 includes an AC alternator 51, a bridge rectifier assembly 52, and a regulator 53. The regulator 53 preferably includes an electronic pulse width modulation type regulator 54, e.g., as the regulators 13, 20 mentioned above, which is well known in the industry, and a field drive (pass) transistor 55, which preferably is a power MOSFET (metal oxide semiconductor field effect transistor) device. A MOSFET device simplifies the overall circuitry, reduces power losses and lowers cost. The regulator 53 also includes a current sensing resistor 56. The regulator has an input lead 60, which is coupled to the output 61 of the bridge rectifier assembly 52 to receive input voltage therefrom relative to a ground or other common connection 62, and also includes a pair of input leads 63, 64, which are coupled across the current sensing resistor 56 to provide as an input to the regulator 54 a voltage that is proportionally representative of the current flowing through the resistor 56. An output lead 65 from the regulator 54 is coupled to the gate of the field drive transistor 55 to provide a pulse width modulated control signal thereto accordingly controlling the current flow through such transistor.

In the apparatus 50 the alternator 51 includes a three-phase stator 70, although more or fewer phases may be employed, and a single field winding 71, although more may be used, as will be appreciated by those having ordinary skill in the art. The field 71 is mounted on a shaft 71s and rotates relative to the stator to induce a signal in the several stator windings. Such signal would be a three-phase AC voltage in the illustrated three phase system, although more or fewer phases may be employed and changes common to the alternator technology, e.g., the number and identification of the parts that actually move relative to others may be varied, as is well known.

The three-phase AC voltage produced by the respective stator windings is rectified by the bridge rectifier assembly 52, which preferably is a full wave rectifier employing a plurality of diodes 72–77 (although a half wave rectifier may be used, if desired). A rectified positive DC voltage then is provided the output 61 of the bridge rectifier assembly 52 by the diodes with respect to the ground 62.

The current through the alternator stator windings 70 and the alternator field winding 71 is regulated by the regulator 53. More specifically, such current is regulated by the load regulator 54, sometimes referred to as a switching current regulator, in combination with the field drive transistor 55 and the current sensing resistor 56. The output of the switching current regulator 54 provides variable pulse width voltage drive via the gate drive line 65. The flyback diode 80 connected in parallel with the alternator field winding 71 is to prevent damaging reverse voltages from occurring across the field drive transistor 55 and the switching current regulator 54 during the off cycle of the pulse width modulated drive signal on line 65.

The current sensing resistor 56 senses the current flowing through the alternator stator windings 70 and field winding 71 and feeds back to the switching current regulator 54 a voltage equivalent to such current flow. The pulse width output of the regulator 54 is adjusted to maintain the current flow through such windings equal to a setpoint value.

The setpoint can be either manually or automatically set to determine the output power. Use of a pulse width modulation (PWM) control signal through an optical coupler (optocoupler) is an exemplary way to automatically interface the setpoint to the load regulator 54.

The power dissipated by the alternator 51 is determined by the square of the current in the stator windings 70 and the field windings 71 times the electrical resistance in the stator 70 and field windings 71. The load power at the rotating shaft input to the alternator 51 is thus directly proportional to the magnitude of the square of the regulated current.

According to the preferred embodiment of the invention, one electronic current regulator 53 controls the amount of current which flows from the alternator stator 70 output and back into the field 71 of the alternator. No other external power resistors or transistors are required. By adjusting the resistance of the stator windings 70 of the alternator 51 so as to make the stator windings more or less lossy, the amount of braking torque can be altered. For example, the number of turns, the wire gauge, and the type of wire materials in the stator and field may be adjusted.

In operation of the apparatus 50, all the current induced in the stator 70 also flows back into the field 71 of the alternator 51. Since the current is regulated and the electrical resistance of the stator and field are fixed, the total power dissipation is simply the square of the current times the total resistance of both the stator and field. Conventional automotive stator windings, for example, are designed to be efficient and have low resistance as described below, and therefore are non-lossy. According to the present invention, conventional automotive stator windings can be replaced with more windings of a smaller gauge wire. The dual effect of the new stator windings, i.e., smaller gauge, is more electrical resistance so as to be lossy, and an increased torque constant for the alternator 51. Accordingly, the alternator 51 dissipates most of the generated power in the lossy stator windings 70 where heat is easily removed. Because of the higher torque constant, K-T, the alternator 51 can generate more torque at lower field rpm's. Since the number of windings is increased, the torque constant K-T will increase. This is a measure of the amount of mechanical torque produced by a specified amount of electrical current. With more windings there is more magnetic interaction and hence more torque. Also associated with this alternator is the K-V or voltage constant, which is a measure of the voltage per thousand rpm's. When the windings are increased, the K-V will also rise because more windings are being cut by the lines of magnetic flux. It will be appreciated, then, that according to the invention, the induced current is used for both exciting the field and generating the braking torque.

It will further be appreciated that the resistance, e.g., lossiness, of the field winding can also be utilized to increase further the amount of mechanical braking torque provided by the alternator 51. Increased number of windings, smaller gauge wire, more lossy wire, etc., can be used to form the field winding as compared to a conventional alternator field winding.

It is noted here that in accordance with the present invention electrical power ($P_E$) is a function of the square of the current (I) times the total combined electrical resistance (R), namely $P_E = I^2 * R$. Also, mechanical power ($P_M$) equals the product of the torque (T) and rpm, namely $P_M = T * rpm$. Setting the preceding two equations equal to each other yields the following relationship:

$$R * rpm = I^2 * R,$$

or $$T = (I^2 * R)/rpm$$

Note that the stator and field current are the same and the voltages are not important in view of the above relationships. What is important is that the braking torque is a function of the square of the current times the resistance divided by the speed.

During operation the electronic switching current regulator 54 maintains a constant current from the alternator 51. Since the regulator 54 is a switching regulator, power losses in the electronics are minimized because standard transistors and design techniques may be utilized. The regulator 54 also protects the alternator from short circuits and sets maximum current limit out of the alternator 54 so that the alternator is protected under all conditions even those occurring at very high alternator shaft rpm's without stressing the electronic parts or losing braking torque control. It should be noted that since there is only one controlling load regulator 54 involved, the alternator 51 and control circuitry 50 will be protected under all operating conditions. Further, the output current is confined to a single conductive path from the output of the alternator 51, i.e., at output 61 of the bridge rectifier assembly 52, through the regulator 53 and back into the field 71 of the alternator; this minimizes the required size and cost of the conductors and the EMI that is emitted by the apparatus 50.

The following are two sample calculations comparing a conventional automotive alternator to an exemplary alternator 51 in accordance with the present invention.

1. Conventional Automotive Alternator Example:
   Field Resistance including Slip Rings: 6 Ohms
   Maximum Field Current at 12 Volts: 2 Amps
   Maximum Field Power Dissipation: 24 Watts
   Stator Resistance including the diodes: 0.1 Ohms
   Maximum Stator Current: 35 Amps
   Maximum Stator Voltage: 12 VDC
   Maximum Useable Load Current: 35 Amps−2 Amps=33 Amps
   Output Power Delivered: 33 Amps×12 Volts=396 Watts
   Maximum Stator Winding Dissipation: 122.5 Watts
   Generating Efficiency: 396/(396+24+122.5)=73%
   Dissipation Efficiency: 27%

The total amount of mechanical energy dissipated with the conventional Automotive Alternator under full load: 24+122.5=146.5 Watts. All additional power dissipation must be dissipated into external elements;

2. Direct Field Drive Alternator 51 Example According to Present Invention;
   Field Resistance including Slip Rings: 6 Ohms
   Maximum Field Current at 48 Volts: 8 Amps
   Maximum Field Power Dissipation: 512 Watts
   Stator Resistance including the diodes: 6 Ohms
   Maximum Stator Current: 8.5 Amps
   Maximum Stator Voltage: 48 Volts
   Maximum Useable Load Current: 8.5 Amps−8 Amps=0.5 Amps
   Output Power Delivered: 0.5 Amps×48 Volts=24 Watts
   Maximum Stator Winding Dissipation: 512 Watts
   Generating Efficiency: 24/(24+512+512)=2.3%
   Dissipation Efficiency: 97.7%

The total amount of mechanical energy dissipated within the alternator 51 under full load: 512+512 Watts or 1024 Watts. The non-dissipated energy, if any, such as the indicated 24 Watts outputted by the alternator 51, would typically be used to power the associated electronics and control circuitry 53. Alternatively, an external power source could be used to power the associated electronics and control circuitry 53. Note the alternator 51 dissipates 6.9 times more electrical energy with over 4 times less current.

The apparatus 50 is designed to be lossy, as well as 100% self-contained and self-generating. A conventional motor, generator, or alternator used to provide mechanical braking is incapable of being operated in this manner because the currents which must be developed to dissipate substantial amounts of power without an external resistance are extremely high and unmanageable. Therefore, when external resistance is added, the current which flows through this external resistance is used only to dissipate power. With the apparatus 50 the induced current is completely self-contained within the apparatus 50 and as a result the current which dissipates power within the alternator 51 also serves to generate current in the field 71 and therefore provides magnetic flux for continued operation. There is no need to be switching between plugging and resistive dynamic braking as in conventional devices because of the wide range of operation provided with the apparatus 50.

Particular advantages of the present invention include the need for only a single electronic regulator circuit to maintain constant power output from the alternator, thus reducing the cost and complexity of the apparatus 1. Moreover, alternator currents are reduced, for example, to as little as 5.5 amps for a typical direct field drive (DFD) system or apparatus 50 of the present invention. In the 5.5 amps example, a 300 watt load can be produced with an alternator resistance of 10 ohms. This is an arbitrary example but it illustrates the importance that the DFD technique varies power not proportionally with current, but by the square of the current. Therefore, the amount of current needed to dissipate a specified mechanical load will be much lower than prior art techniques. There is virtually no power dissipation in the current regulator 53 so the circuitry thereof is much simpler and is more reliable than prior art electronic braking devices. The two regulators 53 and 4 are different. Although both regulate current, regulator 54 is referenced to the field node 64 and "floats" with respect to the common ground 62. Because a current sense resistor is used, the regulated current is independent of the alternator voltage. The regulator 4 is referenced to common ground 6 and assumes a constant, fixed voltage; there is no current sense resistor. Since power is dissipated in the physically large, heavy parts of the alternator 51 in which there already is substantial air flow and surface area, heat is spread out and easily removed so that operating temperatures will be reduced further increasing reliability and stability and lowering cost. Due to direct field drive, the alternator 51 can be operated at the lowest possible shaft rpm. In particular, in the graph of FIG. 3 there are two examples of power dissipation capabilities of an alternator; curve 11P represents power dissipation capability for the prior art alternator design, e.g., as is illustrated in FIG. 1, along with the associated power transistor 21P and power resistor 12P power dissipation. Curve 50P represents power dissipation for the DFD design of the apparatus 50 of the present invention. Note the dynamic range for the apparatus 50 as is represented by the curve 50P is rather large because the power dissipation is due to the square of the current.

For one example of the wide dynamic range of the apparatus 50, with an alternator 51 having a total of 10 ohms internal impedance, as the current is adjusted from 1 to 10 amps, the power dissipation ranges from 10 to 1000 watts. Short term peak power outputs in excess of the steady state capabilities are easily supported. Furthermore, because of the low operating rpm's, the mechanical gear ratio may be reduced resulting in fewer mechanical losses in the system.

Figure 4:
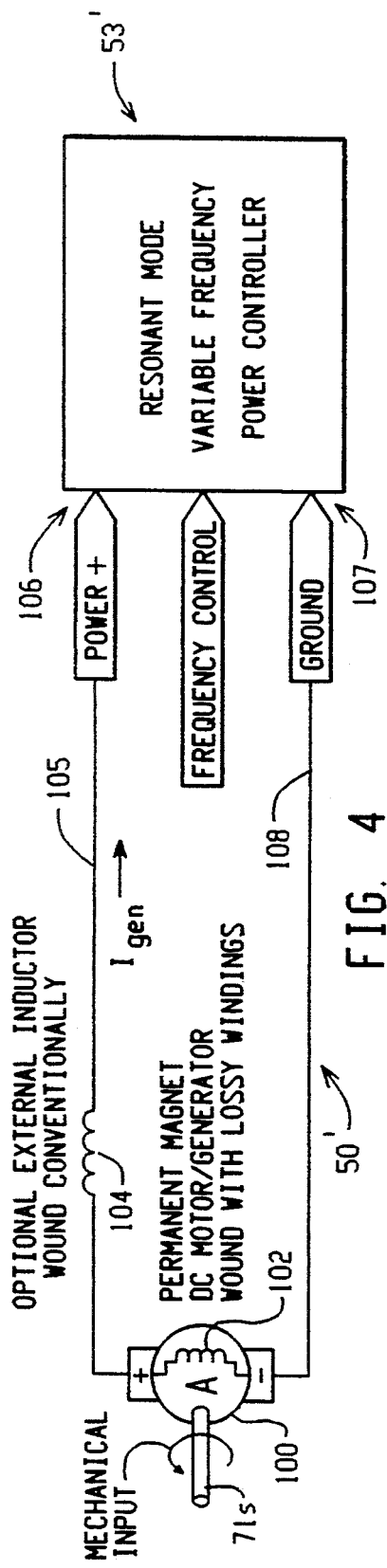
FIG. 4 is a schematic illustration of an apparatus according to another embodiment the invention including a permanent magnet DC motor/generator to generate controlled braking torque using a resonant mode power controller.
Figure 6:
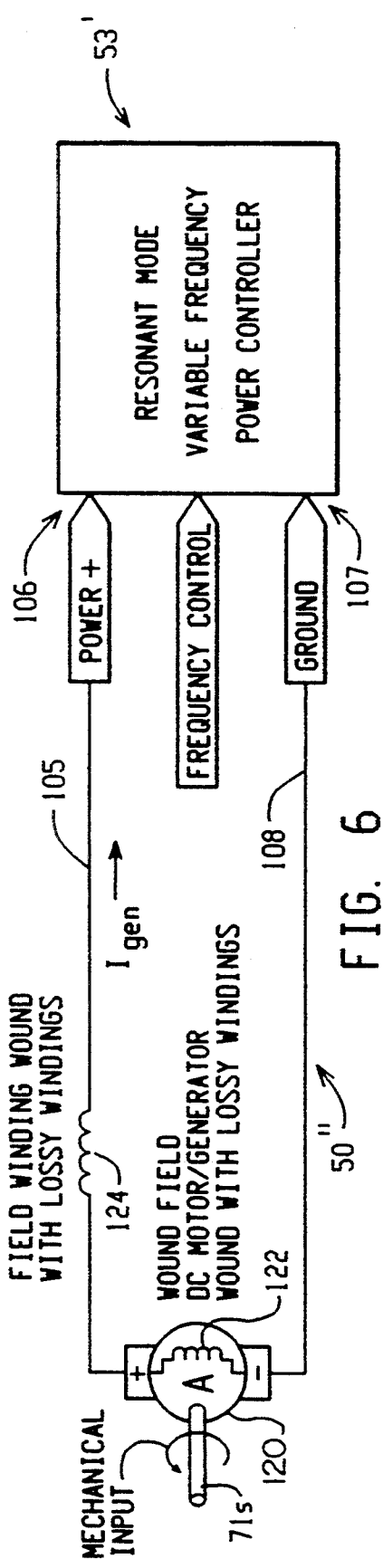
FIG. 6 is a schematic illustration of an apparatus according to yet another embodiment of the invention including a wound field DC motor/generator to generate controlled braking torque using the resonant mode controller of FIG. 5.
Figure 7:
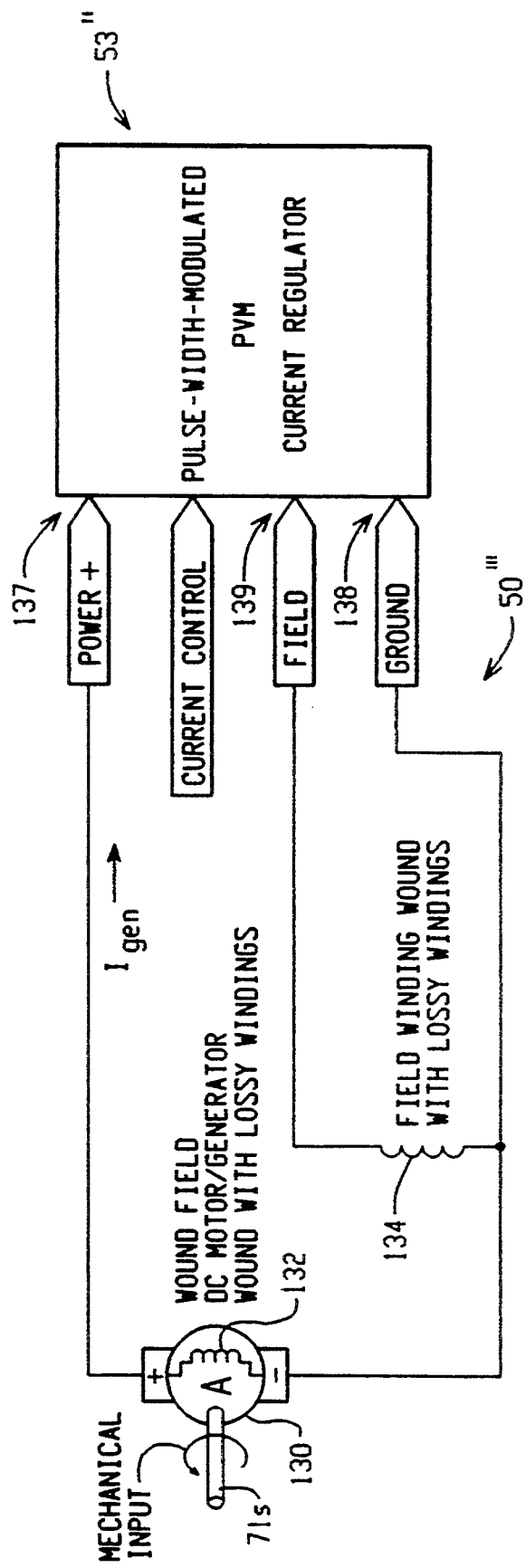
FIG. 7 is a schematic illustration of an apparatus according to still another embodiment of the invention including a wound field DC motor/generator to generate controlled braking using a pulse-width-modulated current regulator.

The above-described aspects of the alternator 51 relating to lossy or highly resistive windings used to generate mechanical braking torque can be similarly employed in other electro-mechanical devices such as motors, generators, etc. For example, FIGS. 4, 6, 7 and 9 each illustrates a different embodiment of the apparatus 50 for generating a mechanical braking torque according to the present invention. FIG. 4 illustrates an embodiment of the apparatus, designated 50', which uses a permanent magnet DC motor or generator with a lossy armature winding, a motor and generator being functionally equivalent in the context of this invention as will be appreciated. FIGS. 6 and 7 show apparatuses 50" and 50''', respectively, which utilize wound field DC motor/generators having armature and field windings wound with lossy windings. The current which is generated by the DC motor/generator as a result of a mechanical input is circulated through the motor/generator in order to dissipate energy in the high resistance of the windings. As is described below, different types of DC motors, for example, can be utilized in accordance with the present invention. Similarly, lossy windings can be utilized in an AC motor or generator as is described with respect to FIG. 9.

Referring to FIG. 4 in detail, an apparatus 50' is shown including a permanent magnet (PM) DC motor/generator 100 having an armature winding 102 wound with lossy windings. The motor/generator 100 includes a shaft 71s which, in response to a mechanical rotation, results in a current $I_{gen}$ being generated which flows from the positive terminal of the motor/generator 100 through an optional external inductor 104, line 105, and into a power input 106 of resonant mode controller 53'. The negative terminal of the motor/generator 100 is connected to a common ground input 107 of the resonant mode controller 53'.

Figure 5:
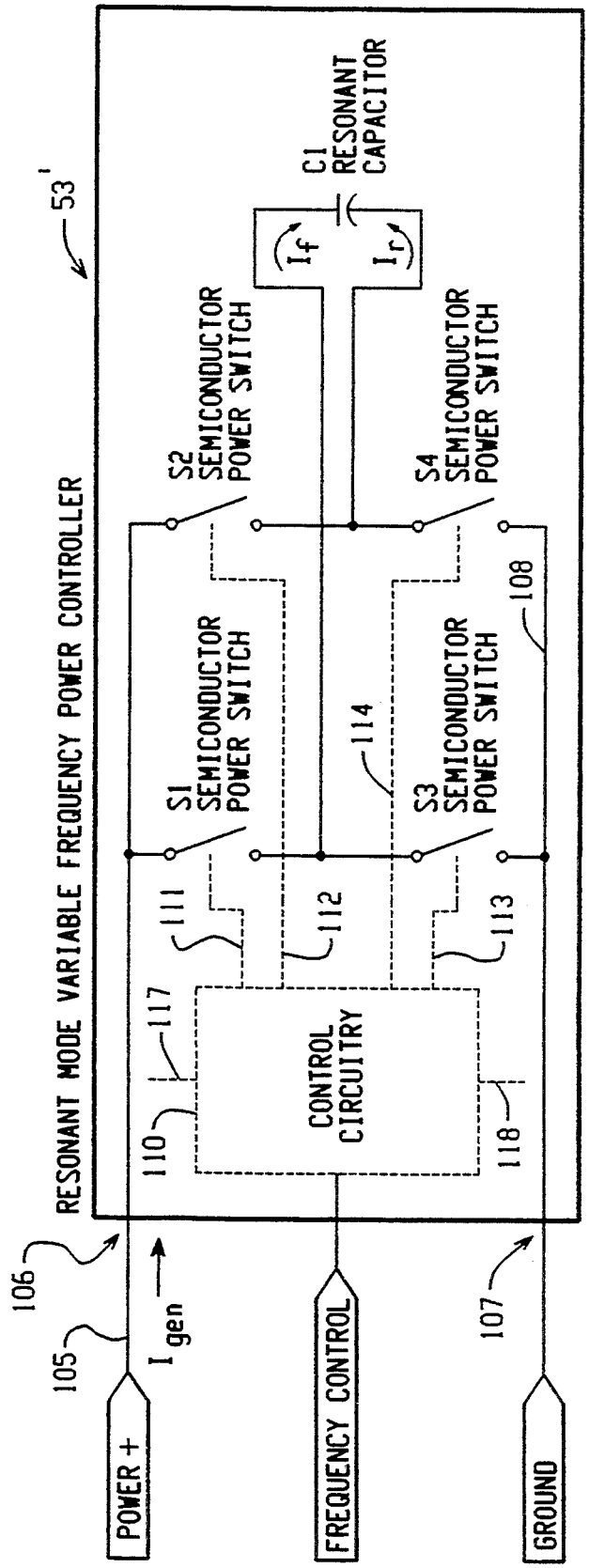
FIG. 5 is a detailed schematic diagram of the resonant mode power controller of FIG. 4.

FIG. 5 shows a detailed diagram of the exemplary resonant mode controller 53' for use in the apparatus 50' of FIG. 4. The power input 106 of the resonant mode controller 53' is connected to respective terminals of semiconductor power switches S1 and S2. The other terminals of the semiconductor power switches S1 and S2 are connected to respective terminals of semiconductor power switches S3 and S4 as is shown. The opposite terminals of the switches S3 and S4 are connected to common ground line 108 which is connected to the ground input 107.

The switches S1–S4 are configured and controlled by a control circuit 110 to function as an H-bridge between the power input 106 on line 105 and the common ground on line 108. The control circuit 110 provides control signals to the switches S1–S4 on lines 111–114, respectively, to open and close the respective switches using conventional switching techniques. Connected across the junction of switches S1 and S3 and the junction of switches S2 and S4 is a resonant capacitor C1.

The resonant mode controller 53' controls the switches S1–S4 to function as an H-bridge whereby when switches S1 and S4 are in a closed or conductive state, switches S2 and S3 are in an open or non-conductive state. On the other hand, when switches S2 and S3 are in the closed state, switches S1 and S4 are in the open state. Thus, when the control circuit 110 causes switches S1 and S4 to be closed (and switches S2 and S3 to be open) in the first half of a control cycle, the generated current $I_{gen}$ flows out of the DC motor/generator 100 and into the capacitor C1 in the direction represented by the arrow $I_f$. The energy associated with the generated current $I_{gen}$ is stored in the capacitor C1 temporarily as a result. Depending on the value of the capacitor C1 and the inductance of the DC motor/generator 100, the capacitor C1 will fully charge after a certain period and the current $I_{gen}$ through the capacitor will go to zero. At this point, the control circuit 110 proceeds to the second half of the control cycle and causes the switches S1 and S4 to open and the switches S2 and S3 to close. As a result, the charge stored on the capacitor C1 is transferred back into the motor/generator 100 as current via line 108 and into the negative terminal of the motor/generator 100 in the direction represented by arrow $I_r$. The current represented by the arrow $I_r$ is fed back into the lossy armature winding 102 where its energy is dissipated. Furthermore, the voltage associated with the energy stored in the capacitor C1 aids in producing current flow through the motor so as to increase the $I_{gen}$ current flow, particularly at low speeds when the speed-voltage is low.

Also, while the switches S2 and S3 are closed the generated current $I_{gen}$ proceeds to charge the capacitor C1 with an opposite polarity as compared to when the switches S1 and S4 are closed. Accordingly, when switches S2 and S3 are again opened and switches S1 and S4 are closed, the existing charge stored on the capacitor C1 is directed back into the motor/generator 100 as current via line 108. Again the energy associated with such current will be dissipated by the lossiness of the armature winding 102.

The control circuit 110 can be any conventional control circuit which drives four switches S1-S4 in an H-bridge arrangement as shown. Accordingly, further detail has been omitted. Power to the control circuit 110 can be provided directly from the power input 106 and the common ground 107 via lines 117 and 118, respectively. A frequency control input provided from an external device such as a CPU or the like provides information (such as a user selected setpoint) to the control circuit 110 which determines the cycle rate at which the respective switches S1, S4 and S2, S3 are opened and closed.

The frequency at which the switches S1, S4 and S2, S3 are cycled, i.e., opened and closed, preferably is such that the capacitor C1 has adequate time to fully charge and the generated current $I_{gen}$ (in either direction) goes to zero before the switches S1, S4 open and the switches S2, S3 close, and vice versa. As a result, switching amongst the switches S1-S4 will occur during a zero current condition so as to avoid high currents at the time of switching which can damage the semiconductor switches S1-S4, and to ensure that substantially all power dissipation is confined to the motor/generator 100 elements.

It will therefore be appreciated that power is dissipated in the lossy armature winding 102 of the motor/generator 100 whenever current flows out of or into the motor/generator 100. The total power dissipation of the motor/generator 100, and therefore the resultant braking torque provided to the shaft 71s, is a function of the resistance or lossiness of the armature winding 102 and the value of the RMS current flowing into or out of the motor/generator 100. The control circuit 110 establishes the RMS current based on the frequency at which the switches S1, S4 and S2, S3 are switched. As the frequency is raised, the braking torque provided by the apparatus 50' increases, at least up to the resonant frequency of the apparatus 50'. The resonant frequency is of course a function of the value of the capacitor C1 and the inductance of the armature winding 102. If desired, the optional external inductor 104, which can be wound conventionally, i.e., non-lossy, can be added to alter the resonant frequency of the circuit. In a sample embodiment, the value of the capacitor C1 may be 2.5 nanofarads and the inductance of the motor can be 0.1 henry, for example. An exemplary switching frequency of the control circuit 110 is 10 kilohertz. The inductor 104 can be included if it is desired to lower the natural resonance of the circuit, therefore accommodating a lower switching frequency of the control circuit 110, for example.

Summarizing, the apparatus 50' with resonant mode controller 53' utilize a capacitor C1 which resonates with the PM DC motor/generator's 100 inherent, internal inductance. In addition, the optional external inductor 104 can also be used. The overall result is that all or substantially all of the energy generated as a result of a mechanical input to the shaft 71s is dissipated in the deliberately inefficient, resistive, lossy winding 102 within the PM DC motor/generator 100, and not in the inductor 104 or capacitor C1 which are primarily reactive elements that do not dissipate power. Specifically, reactive elements such as inductors and capacitors handle voltage and current that is 90° out of phase. Hence, there is no in-phase or real power dissipation of any significance in the apparatus 50' except in the lossy winding 102 of the DC motor/generator 100.

A particular advantage of using the PM DC motor/generator 100 is the maximum braking torque control capabilities realized at low speeds due to the speed-torque characteristic of PM DC motors/generators. Specifically, since the torque of a DC motor/generator is inversely proportional to speed, the PM DC motor/generator 100 can control high levels of mechanical torque at lower rpm's. Thus, mechanical gear ratios can be minimized.

Referring briefly to FIG. 6, shown is an apparatus 50" which uses a wound field DC motor/generator 120 having a lossy armature winding 122 and a lossy field winding 124. The positive and negative terminals of the motor/generator 120 are connected to the power input 106 and ground input 107, respectively, of the resonant mode controller 53'. Again, the resonant mode controller 53' is used to temporarily store the energy associated with the current $I_{gen}$ generated by the DC motor/generator 120. The energy is stored and transferred from the resonant capacitor C1 during each switching cycle as described above with respect to FIG. 4. The energy stored in the resonant capacitor C1 is transferred back into the motor 120 as current via the ground line 108 and is dissipated in the lossy windings 120 and 124. As in the previous embodiment, power is dissipated whenever current flows out of or into the motor/generator 120. Total power dissipation (and the resultant braking torque) is a function of the resistance of the motor windings 122 and 124 and the value of the RMS current flowing into or out of the motor/generator 120. The user can control the RMS current, and thus the braking torque, simply by providing a control signal to the control circuit 110 to adjust the cycle rate of the switches S1-S4.

Referring now to FIG. 7, a wound field DC motor/generator 130 having a lossy armature winding 132 and a lossy field winding 134 is shown. The positive and negative terminals of the motor/generator 130 are connected to the power input 137 and common ground input 138, respectively, of the PWM current regulator 53". As with the other embodiments described herein, the DC motor/generator 130 also includes a shaft 71s which, when rotated by a mechanical input, generates a current $I_{gen}$. The current $I_{gen}$ in this case is controlled by a pulse-width-modulated (PWM) current regulator 53" similar to that described above with respect to the embodiment of FIG. 2.

Figure 8:
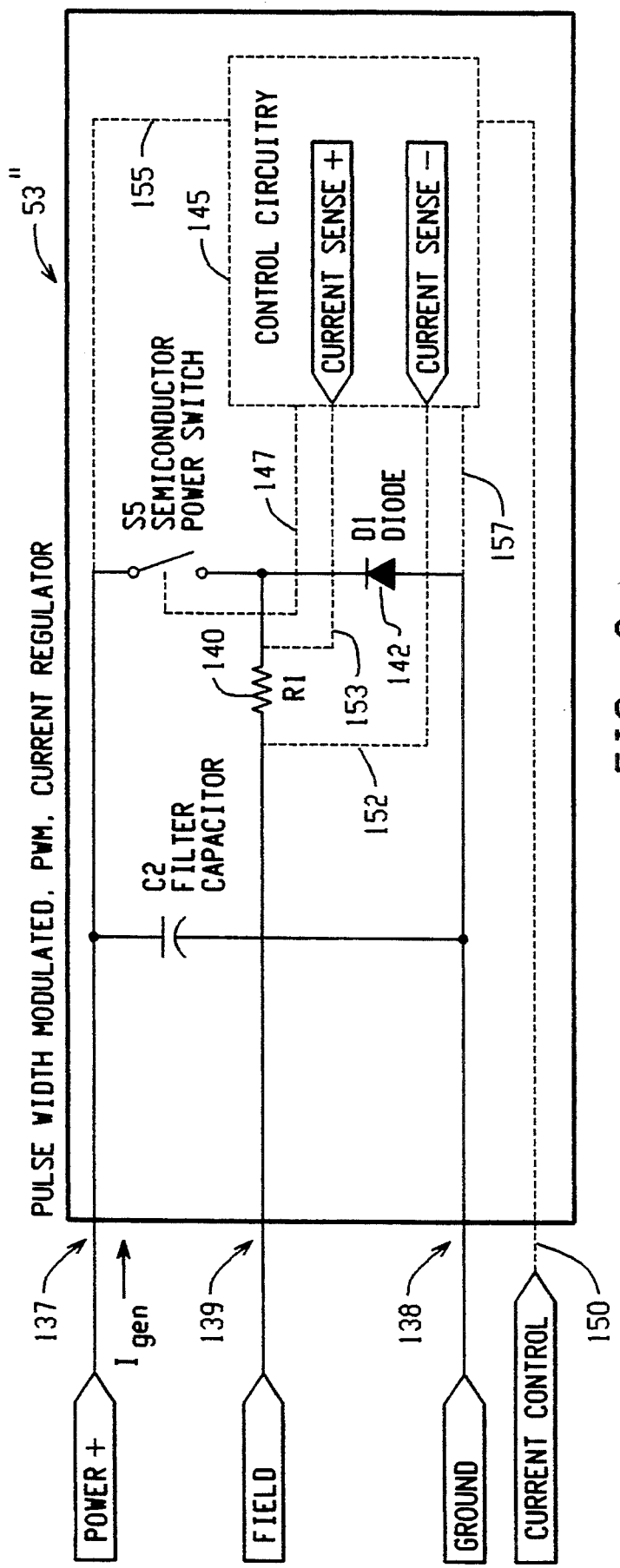
FIG. 8 is a detailed schematic diagram of the pulse-width-modulated current regulator of FIG. 7.

FIG. 8 illustrates how the generated current $I_{gen}$ is input to the power input terminal of the PWM current regulator 53". The field winding 134 is connected between the common ground input 138 and a field input terminal 139 of the PWM current regulator 53". The PWM current regulator 53" includes a semiconductor power switch S5 having one terminal connected to the power input terminal 137 and the other terminal connected to the connection between a current sense resistor 140 and a diode 142. Specifically, the cathode of diode 142 is connected to a terminal of the current sense resistor 140. The anode of the diode 142 is connected to the common ground input 138. The other terminal of the current sense resistor 140 is connected to the field input terminal 139.

A control circuit 145 selectively opens and closes the semiconductor power switch S5 via control line 147. When the switch S5 is closed, the generated current $I_{gen}$ from the DC motor/generator 130 flows through the switch S5, the resistor 140, and back into the field winding 134, thus resulting in power dissipation in the lossy field winding 134. The flow of the current $I_{gen}$, and therefore the torque provided by the apparatus 50''' is regulated in substantially the same manner as described above with respect to the AC alternator embodiment of FIG. 2. More specifically the PWM regulator control circuit 145 provides a variable pulse width voltage drive to the switch S5 (for example a MOSFET) via the control line 147. The current sense resistor 140 senses the current $I_{gen}$ flowing through the armature winding 132 and field winding 134 and feeds back to the control circuit 145 a voltage across lines 152 and 153 equivalent to such current flow. The pulse width output of the control circuit 145 on line 147 is adjusted to maintain the desired current flow through such windings. The diode 142 is provided so as to provide a current path when the switch S5 is opened in order that any energy which may be stored in the field winding 134 when the switch S5 is opened is provided with a path back into the field winding via the resistor 140.

The rate and/or pulse width at which the semiconductor power switch S5 opens and closes is determined by a user provided control input signal (or setpoint) via line 150. As a result, the amount of braking torque provided by the apparatus 50''' can be controlled. The current regulator 53'' controls the flow of the $I_{gen}$ current back into the field winding 134 where the energy associated therewith is dissipated and mechanical braking torque is produced.

It will be appreciated that not only does the lossiness of the field winding 134 and armature winding 132 contribute to the mechanical braking torque which is produced, but also the magnetic field which results by directing the generated current $I_{gen}$ back into the field winding 134 so as to oppose the direction of rotation of the mechanical input, thus providing further braking torque. The current regulator circuit 53'' also includes a filter capacitor C2 connected across the power terminal 137 and the ground terminal 138 to provide smoothing at the power input terminal which also serves to provide power to the control circuit via lines 155 and 157.

In the preferred embodiment, the field winding 134 is designed so as to be more lossy than the armature winding 132 for the reason that the field winding is typically larger and located to the exterior of the DC motor/generator 130 across a larger surface area where heat is more easily dissipated.

Figure 9:
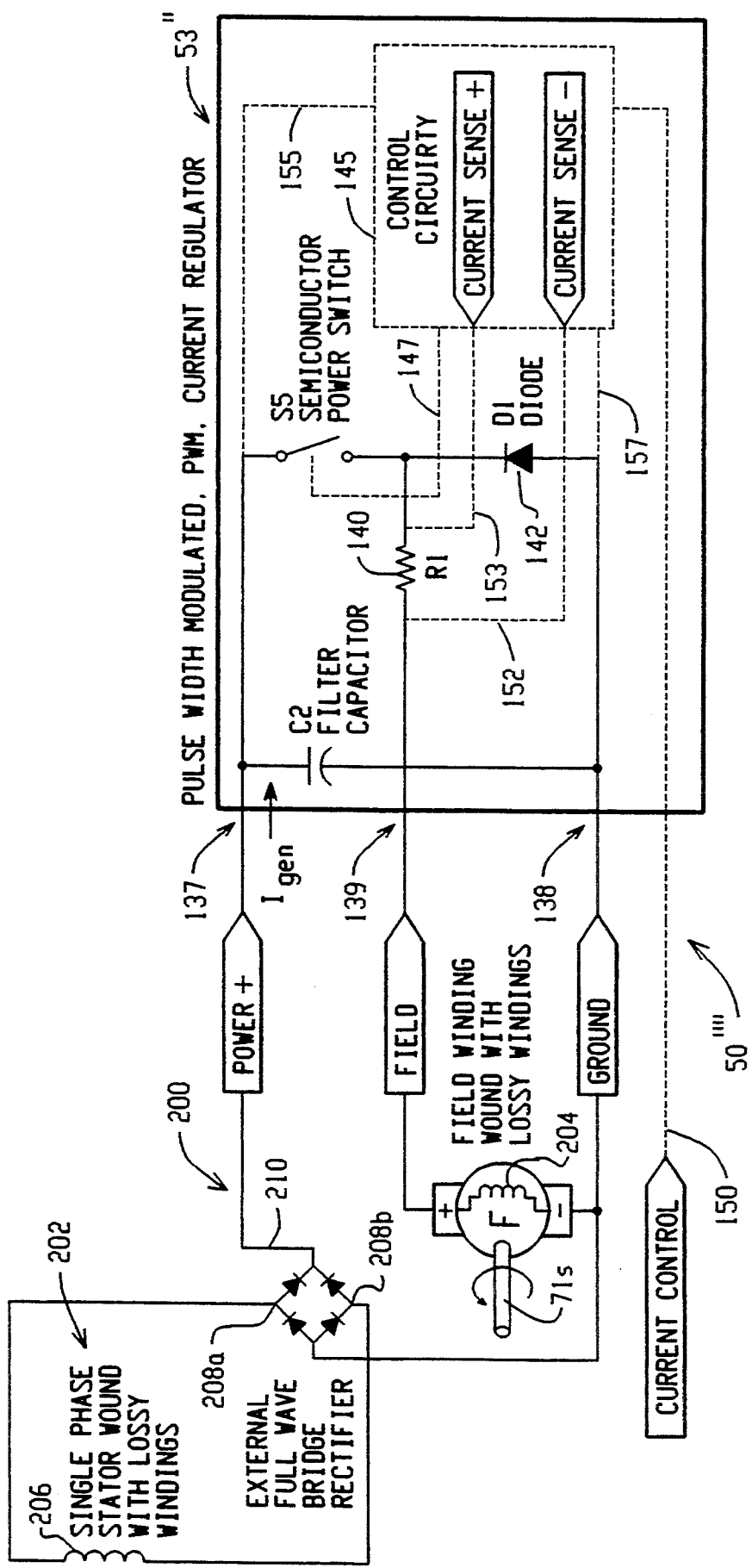
FIG. 9 is a detailed schematic diagram of an apparatus according to the invention including a single phase AC generator to generate controlled braking using a pulse-width-modulated current regulator.

Another embodiment of the invention in the form of apparatus 50'''' is shown in FIG. 9 and uses a single phase AC generator 200 in combination with a full wave rectifier circuit 202 and the PWM current regulator 53'' of FIG. 8. The AC generator 200 includes a lossy field winding 204 having its output terminals (consisting of slip rings) coupled to the field input terminal 139 and ground terminal 138 of the PWM current regulator 53'', respectively. The AC generator 200 further includes a lossy stator winding 206 having its terminals coupled to the inputs 208a, 208b of the rectifier circuit 202.

The rectifier circuit 202 rectifies the current induced in the stator 206 as a result of a mechanical input to a shaft 71s of the generator 200. The induced current, $I_{gen}$, flows on line 210 from the rectifier circuit 202 into the power input terminal 137. The PWM current regulator 53'' again controls the flow of the current $I_{gen}$ as it is directed through the current sense resistor 140 and into the lossy field winding 204 via filed terminal 139. As in the above-discussed embodiments, the lossy windings 204 and 206 function to dissipate the electrical energy as heat to produce the mechanical braking torque.

A poly-phase AC generator embodiment would be substantially identical to the embodiment of FIG. 9, with the exception that the rectifier circuit 202 would be modified to handle the added phases.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

STATEMENT OF INDUSTRIAL APPLICATION

It will be appreciated that the apparatuses of the invention may be used with virtually any type of electro-mechanical device to provide a controlled mechanical braking torque for various applications.

We claim:

1. An electrical apparatus for generating a mechanical braking torque, comprising:
   an electro-mechanical device which generates electrical energy as a function of a mechanical input using at least one winding, said at least one winding being lossy; and
   means for dissipating substantially all said electrical energy in said at least one winding to generate said mechanical braking torque.

2. The electrical apparatus of claim 1, said electromechanical device comprising a device selected from the group consisting of an alternator, a generator and a motor acting as a generator.

3. The electrical apparatus of claim 1, wherein said electro-mechanical device is an alternator and said at least one winding is a field winding of said alternator.

4. The electrical apparatus of claim 1, wherein said electro-mechanical device is a wound field motor and said at least one winding is a field winding of said wound field motor.

5. The electrical apparatus of claim 4, wherein said wound field motor is a series wound motor.

6. The electrical apparatus of claim 4, wherein said wound field motor is a shunt wound motor.

7. The electrical apparatus of claim 4, wherein said wound field motor is a DC motor.

8. The electrical apparatus of claim 1, wherein said electro-mechanical device is a DC motor.

9. The electrical apparatus of claim 1, wherein said electro-mechanical device is a permanent magnet type DC motor and said at least one winding comprises an armature winding of said permanent magnet type motor.

10. The electrical apparatus of claim 1, wherein said at least one winding comprises a plurality of lossy windings and said means for dissipating causes substantially all said electrical energy to be dissipated in said plurality of windings to generate said braking torque.

11. The electrical apparatus of claim 1, further comprising current regulator means for regulating the flow of current in said electro-mechanical device in order to control the amount of said mechanical braking torque.

12. The electrical apparatus of claim 11, said current regulator means comprising a resonant mode power controller.

13. The electrical apparatus of claim 12, said resonant mode power controller comprising at least one of a capacitor and an inductor for temporarily storing energy associated with said current.

14. The electrical apparatus of claim 11, said current regulator means comprising a pulse-width modulated current regulator.

15. An electrical apparatus for generating a mechanical braking torque, comprising:
 an electro-mechanical device having a winding for generating an electrical current as a function of a mechanical input, said winding being lossy; and
 means for directing substantially all of said electrical current into said winding to result in said mechanical braking torque.

16. The electrical apparatus of claim 15, said electro-mechanical device comprising a device selected from the group consisting of an alternator, a generator and a motor acting as a generator.

17. The electrical apparatus of claim 15, further comprising current regulator means for regulating the flow of current in said electro-mechanical device in order to control the amount of said mechanical braking torque.

18. The electrical apparatus of claim 17, said current regulator means comprising a resonant mode power controller.

19. The electrical apparatus of claim 18, said resonant mode power controller comprising at least one of a capacitor and an inductor for temporarily storing energy associated with said electrical current.

20. The electrical apparatus of claim 17, said current regulator means comprising a pulse-width modulated current regulator.

21. The electrical apparatus of claim 1, said electro-mechanical device comprising AC alternator means for generating said electrical energy as a function of said mechanical input, rectifier means for rectifying the output from said AC alternator means to provide a rectified DC output, and current regulator means for controlling the amount of current which flows from the alternator output and back into the field of the alternator, said alternator means and current regulator means being coupled such that current induced in the stator flows back into the field winding, and said at least one winding comprising at least one of said stator and said field winding.

* * * * *